US008977651B2

(12) United States Patent
Lin

(10) Patent No.: US 8,977,651 B2
(45) Date of Patent: Mar. 10, 2015

(54) METHOD AND APPARATUS FOR MULTI-PROCESS ACCESS TO A LINKED-LIST

(75) Inventor: David Hsing Lin, Santa Clara, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2213 days.

(21) Appl. No.: 10/823,845

(22) Filed: Apr. 14, 2004

(65) Prior Publication Data

US 2005/0234933 A1    Oct. 20, 2005

(51) Int. Cl.
*G06F 17/30* (2006.01)
*G06F 7/00* (2006.01)
*G06F 9/52* (2006.01)

(52) U.S. Cl.
CPC ............ *G06F 17/30958* (2013.01); *G06F 9/52* (2013.01); *G06F 9/526* (2013.01)
USPC ........................................... 707/800; 707/704

(58) Field of Classification Search
USPC ..................... 707/1–10, 100–104.1, 200–205, 707/500–505, 704, 800
See application file for complete search history.

(56) References Cited

U.S. PATENT DOCUMENTS

| 5,924,098 A | 7/1999 | Kluge |
| 6,151,688 A * | 11/2000 | Wipfel et al. .................... 714/48 |
| 6,345,313 B1 * | 2/2002 | Lindholm ...................... 719/315 |
| 6,449,614 B1 * | 9/2002 | Marcotte ............................ 707/8 |
| 6,735,760 B1 * | 5/2004 | Dice .............................. 717/139 |
| 7,213,244 B2 * | 5/2007 | Chang et al. .................. 717/161 |
| 2004/0205304 A1 * | 10/2004 | McKenney et al. ........... 711/148 |

FOREIGN PATENT DOCUMENTS

| JP | 2000315162 | | 11/2000 |
| JP | 2000315162 A | | 11/2000 |
| JP | 2002501649 A | | 1/2002 |
| WO | 9900725 A1 | | 1/1999 |

OTHER PUBLICATIONS

Notice of Rejection of Japanese Patent Application 2005-113248 mailed Apr. 5, 2007.
Japanese Patent Office Official Action mailed Apr. 5, 2007 concerning JP 2005-113248 (Japanese and English language translation attached).

* cited by examiner

*Primary Examiner* — Hosain Alam
*Assistant Examiner* — Navneet K Ahluwalia
(74) *Attorney, Agent, or Firm* — Intellectual Property Development

(57) ABSTRACT

Data is retrieved from a linked-list by locking the linked-list, retrieving data from an element in the linked-list, advancing to a subsequent element in the linked-list while a breakpoint is not encountered and marking the subsequent element as "in-use" when a breakpoint is encountered. A reference to the subsequent element is then created before the linked-list is unlocked.

18 Claims, 10 Drawing Sheets

METHOD AND APPARATUS FOR MULTI-PROCESS ACCESS TO A LINKED-LIST

BACKGROUND

Computer systems have traditionally been used for the storage and retrieval of data. Data is the raw stuff that makes up information. Data is comprised of bits and bytes stored on computer readable medium. Aside from these definitions, data can be defined in any manner suitable for a particular application. Information is generally thought of as useful stuff that is represented by data. For example, a report on stock price history is, according to this definition, information. The actual stock prices for one or more time periods are generally considered to be the raw data that makes up the information. Again, these definitions are presented here only to illustrate some basic concepts. In fact, the actual definition of these terms has been, and will doubtlessly continue to be widely debated.

Whatever the definitional precepts used to refer to data or information, one common objective remains that of efficient storage, retrieval and management of data (and/or information). Storage, retrieval and management of information are accomplished through the use of programmatic algorithms that manipulate data structures. Today, these are executed and maintained on computing systems.

A data structure is a mechanism for collecting related data. For example, related data can include a stock opening price and a stock closing price on a particular stock trading day. Another example of related data can include an inventory stock item number, a description of the item and an inventory quantity value. These examples are presented here to further illustrate some basic concepts and are not intended to limit the application of other concepts introduced in the detailed description that follows.

A commonly used data structure is known as a linked-list. A linked-list comprises a collection of one or more a data elements. Typically, each of these data elements includes at least one data container and at least one reference to another data element. Generally, a referenced element is the next element in a chain of elements; hence the term linked-list. It should be noted that the term "data element" (or simply "element"), as used herein, refers to a single data structure of a particular definition. A linked-list, for example, will include one or more such elements.

A linked-list is commonly used to hold data (or information depending on your perspective). Once the data is stored in the linked list, it is a fairly simple task to "traverse" the linked-list in order to discover needed data. In one common application of a linked-list, data is first retrieved from a slower computer readable medium, for example a hard disk drive or a compact disk (CD) read-only-memory (ROM). Once the data is retrieved from the slower computer readable medium, it is stored in the linked-list from whence it can be quickly retrieved.

One problem with a linked-list is that this type of data structure does not readily accommodate access by multiple processes. For example, consider a situation where a linked-list is used to store data pertaining to the inventory of a retail store. If multiple point-of-sale terminals need to access or modify the linked-list, there may be significant delay. This is because of the very nature of a linked list. In order to use a linked-list, the list must remain constant during a particular access session. Because each element in the linked-list is referenced by a preceding element, a process that needs to search for data stored in some arbitrary element in the linked-list needs to examine the contents of each element. Examination of each element is needed to determine if that element has the requisite data to fulfill a process search. Accordingly, once the data has been discovered, further examination is moot except in the case where a thorough and complete search of the linked-list is required. Examination of each element is also required to discover the next element in the linked-list by way of a reference included in a current linked-list element.

This becomes extremely problematic in a multi-processor environment. Especially when considering the need to discover a subsequent element in a linked-list by means of a reference included in its predecessor. When one process needs to search for data in the linked-list, all other processes must be staved-off so that the linked-list is not altered. If a first process were to relinquish control over a linked-list during a search, a second process may inadvertently (or more probably, deliberately, but with no malice) remove an element or add an element to the linked-list. Either of these two functions would corrupt the reference chain that the first process needs to complete a search activity. Because of this, a process can not relinquish control of a linked-list during a search. This renders the linked-list a resource subject to periods of unavailability when one process is using the list. Other processes that need to gain access to the list are forced to wait for the completion of any pending data search.

SUMMARY

A method and apparatus for retrieving data comprising locking a linked-list, retrieving data from an element in the linked-list, advancing to a subsequent element in the linked-list while a breakpoint is not encountered and marking the subsequent element as "in-use" when a breakpoint is encountered. A reference to the subsequent element is then created before the linked-list is unlocked.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
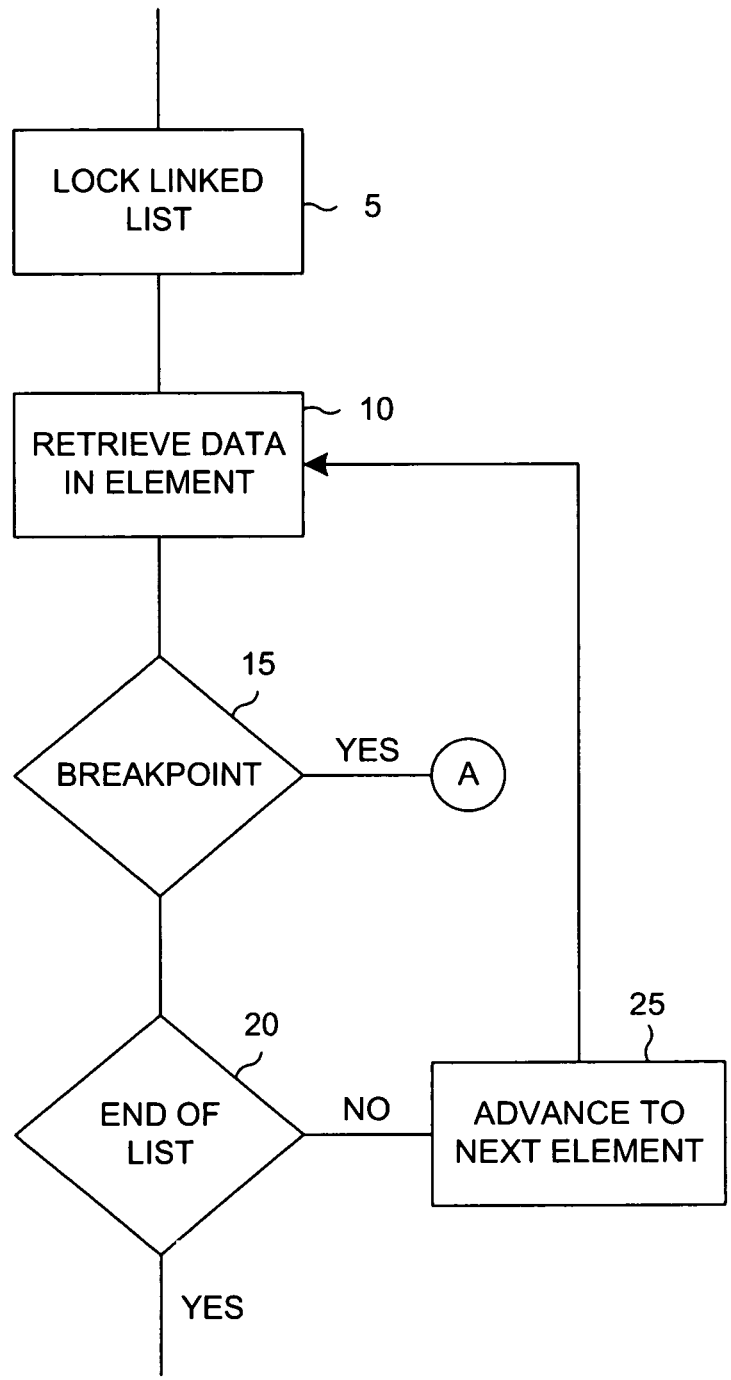
FIG. 1 is a flow diagram that depicts one example illustrative method for retrieving data.

FIG. 1 is a flow diagram that depicts one example illustrative method for retrieving data. Once data is stored in a linked-list, data is retrieved from the linked-list by first locking the linked-list (step 5) and then retrieving information from an element in the linked list (step 10). According to this example illustrative method, a linked-list is accessed according to a breakpoint definition. A breakpoint definition is used to define when a first process using a particular linked-list is required to relinquish control over the linked-list so that a second process can gain access to the linked-list. Accordingly, so long as a breakpoint is not encountered (step 15), a first process can continue to retrieve data from the linked-list. For example, according to one variation of the present method, retrieval of data from the linked-list continues by advancing to a subsequent element (step 25) in the linked list so long as the end of the list (step 20) has not been encountered.

Determination of a breakpoint can be accomplished, according to one variation of the present method, by establishing a maximum number of data elements that can be traversed in a single access session, where a single access session is defined as an interval where one process has exclusive access to a linked-list. According to yet another variation of the present method, a breakpoint is defined by establishing a maximum time limit for a single access session. Other types of breakpoint can be used, and examples herein provided for illustrative purpose are not intended to limit the scope of the claims appended hereto.

Figure 2:
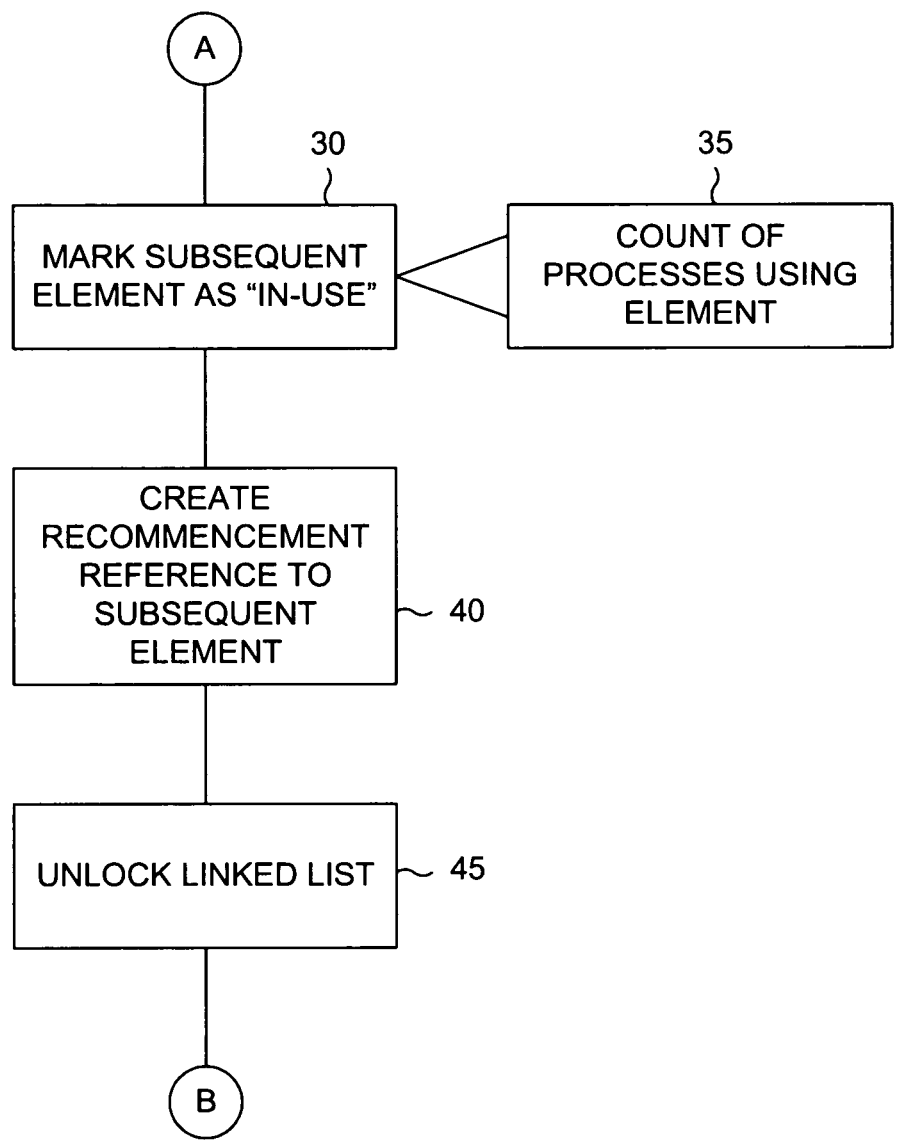
FIG. 2 is a flow diagram that depicts one example method for relinquishing control of a linked-list.

FIG. 2 is a flow diagram that depicts one example method for relinquishing control of a linked-list. When a breakpoint is encountered (step 15), this example illustrative method provides for marking a subsequent element in the linked-list as "in-use" (step 30). According to one variation of the present method, this is accomplished by maintaining a count (step 35) of the number of processes that are using a particular element in a linked-list. Once the subsequent element in the linked-list is marked as "in-use", a reference to the subsequent element is created (step 40). This reference is referred to as a "recommencement reference". A first process can then unlock the linked-list (step 45), thereby allowing an opportunity for a second process to gain control over the linked-list.

Figure 3:
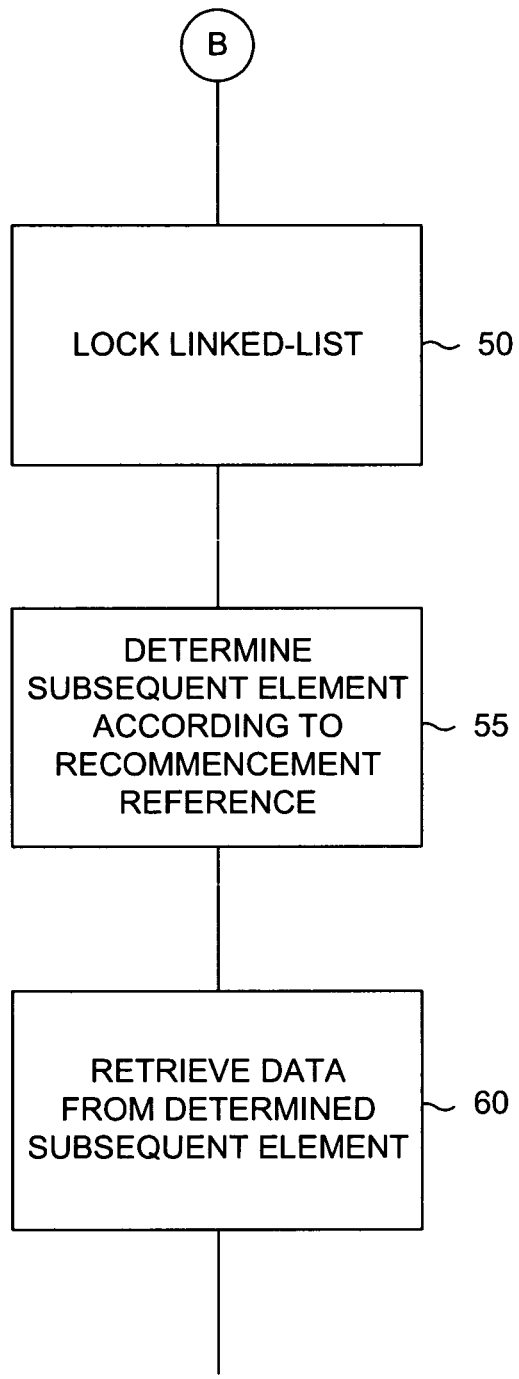
FIG. 3 is a flow diagram that depicts one example method for resuming access to a linked-list.

FIG. 3 is a flow diagram that depicts one example method for resuming access to a linked-list. When a first process subsequently regains control over a linked-list, it again locks the linked-list (step 50). In order to resume access to the linked-list, the first process determines a subsequent element in the linked-list according to the recommencement reference that points to a subsequent element (step 55). This recommencement reference is created by the first process prior to relinquishing control over the linked-list (as described in step 40). Once a subsequent element is determined in this manner, data is retrieved from the subsequent element (step 60). The linked-list can then be further traversed using a reference to a subsequent element included in a current element in the linked-list.

Figure 4:
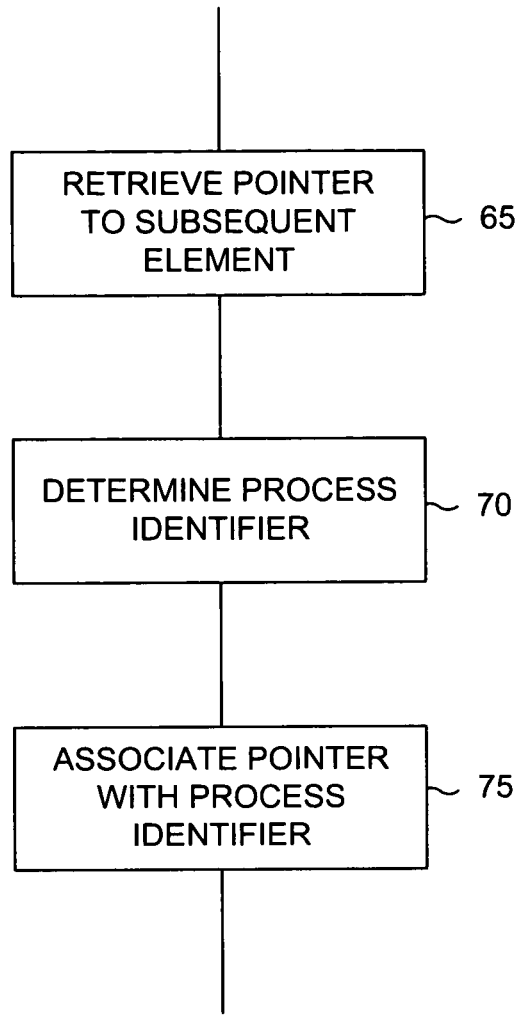
FIG. 4 is a flow diagram that depicts one example method for creating a reference to a subsequent element.

FIG. 4 is a flow diagram that depicts one example method for creating a reference to a subsequent element. According to this example method, a reference to a subsequent element in a linked-list is created by retrieving a pointer to the subsequent element (step 65), determining a process identifier (step 70) and associating the pointer with the process identifier (step 75).

Figure 5:
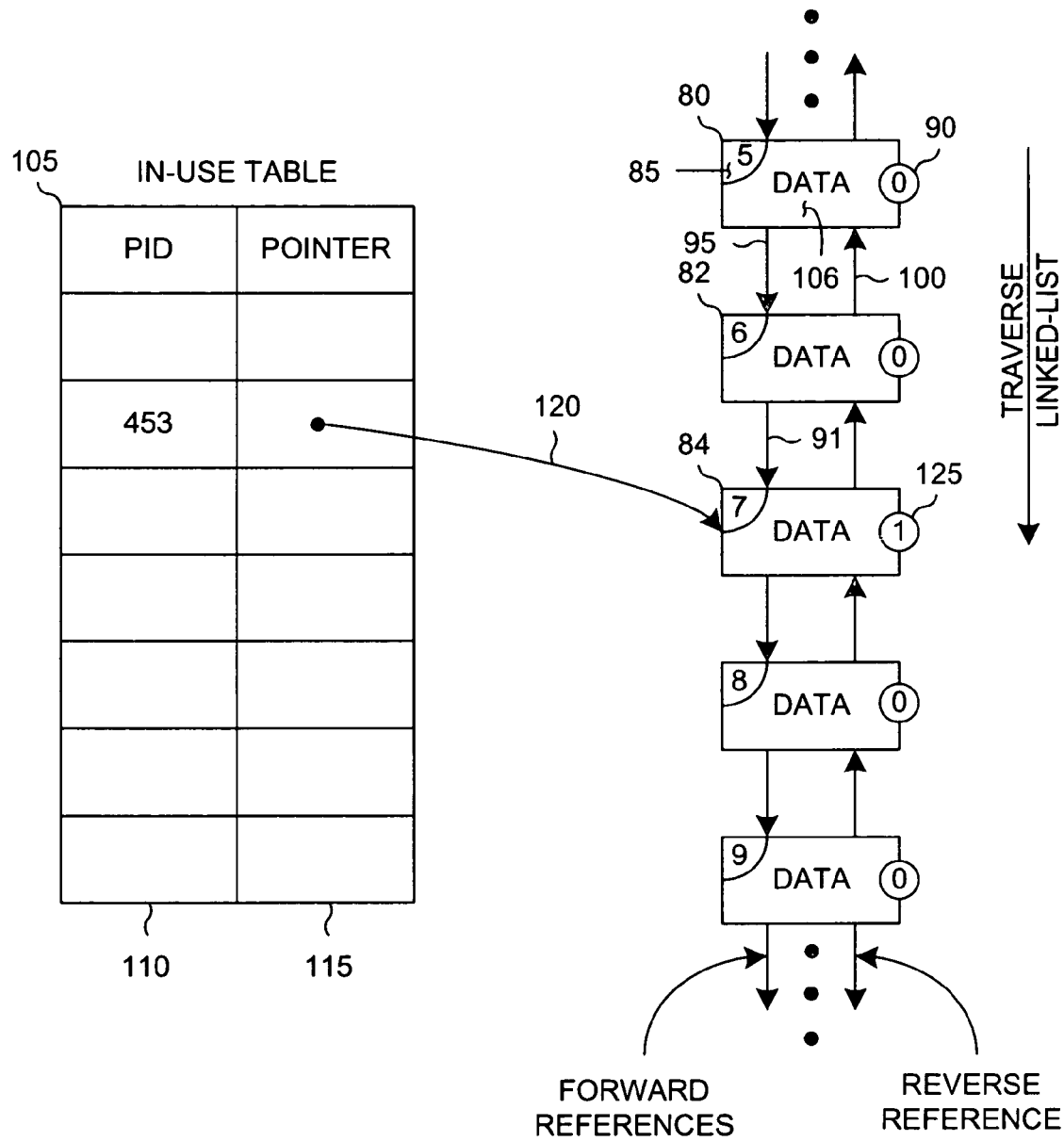
FIG. 5 is a pictorial diagram that illustrates application of one example method for creating a reference to a subsequent element.

FIG. 5 is a pictorial diagram that illustrates application of one example method for creating a reference to a subsequent element. A data element 80 typically includes data 106. Each element 80 also typically includes a forward reference 95 and a reverse reference 100. For purposes of illustration, each element is identified by an element identifier 85. As depicted in the figure, the element identifier 85 comprises an ordinal number. It should be noted that the structure of a data element can vary according to application of the present method and structure of the data element 80, the use of forward and reverse references and the use and complexion of an element identifier, as depicted in the figure, are not intended to limit the scope of the claims appended hereto.

As a particular process traverses a linked-list which includes constituent data elements 80, the process typically uses the forward reference 95 of a current data element 80 to discover a subsequent data element 82 included in the linked-list. When a process needs to backtrack through the linked-list, a preceding data element is discovered through the reverse reference 100. According to one illustrative use case, the present method is applied as a process traverses a linked-list and encounters a breakpoint. As depicted in the figure, a breakpoint is encountered when the process reaches a particular data element referred to by reference designator 82. Applying the present method, a subsequent data element, referred to in the figure as reference designator 84, is marked as being "in-use". According to one variation of the present method, a data element also includes an "in-use" indicator 90. Accordingly, a subsequent data element, according to this variation of the present method, is marked as being "in-use" by incrementing the "in-use" indicator to reflect the fact that a first process was using the linked-list, has relinquish control over the linked-list and expects to resume traversing the linked-list at the subsequent data element 84.

According to yet another illustrative use case, a pointer to a subsequent data element 84 is determined according to a forward reference 91 included in a current data element 82. The value of forward reference 91 is copied to an in-use table 105. Accordingly, the in-use table 105 uses a process identifier, stored in a process identifier field 110, as an index useful in discovering an associated reference (e.g. a pointer) to a subsequent data element 84. It should be noted that when a process resumes access to the linked-list, it uses the process identifier to select a pointer 120 from the in-use table 105. As such, the selected pointer 120 refers to the subsequent data element 84. To continue traversing the linked-list, the process uses either the forward or reverse references included in the subsequent data element 84 referenced by the pointer 120 that the process retrieves from a pointer field 115 included in the in-use table 105. It should be noted that the structure of an in-use table 105 depicted in the figure is not intended to limit the scope of the claims appended hereto. It should be further noted that any data, information, process identifiers or data element structure represented in the figure is not intended to limit the scope of the claims appended hereto.

Figure 6:
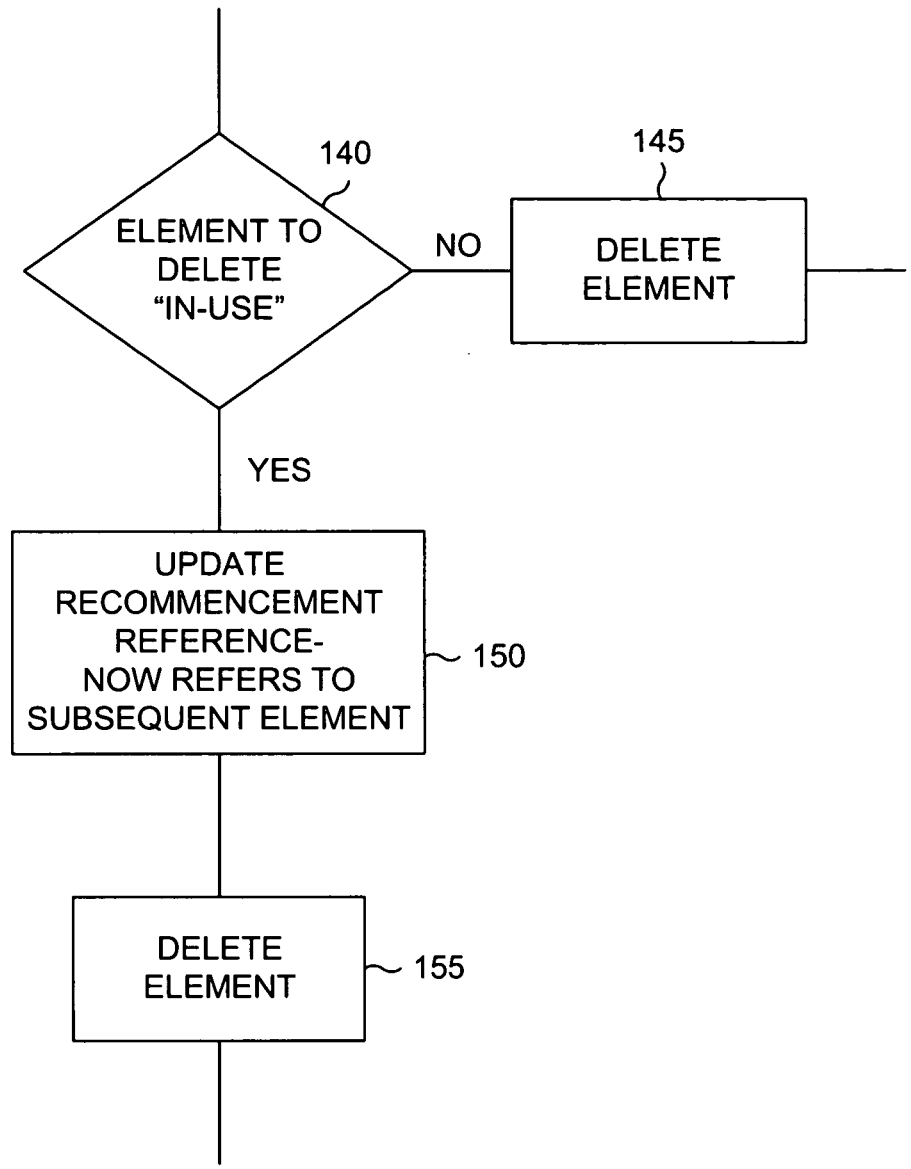
FIG. 6 is a flow diagram that depicts one example method for deleting a data element from a linked-list.

FIG. 6 is a flow diagram that depicts one example method for deleting a data element from a linked-list. Ordinarily, when a data element is deleted from a linked-list, the forward and reverse references included in adjacent preceding and subsequent data elements are adjusted to reflect the deletion of a particular data element. According to the present method, a data element is deleted (step 145) in an ordinary manner when the data element is not "in-use" (step 140). When a data element is "in-use" (step 140), the present method provides for updating a reference to the data element (step 150), wherein the reference to be updated is the reference to a subsequent data element created by a process prior to relinquishing control over a linked-list (i.e. the recommencement reference). Updating of the reference is accomplished by updating the reference to refer to a data element that is subsequent to the data element that is to be deleted. Once the recommencement reference is updated, the data element can be deleted (step 155).

Figure 7:
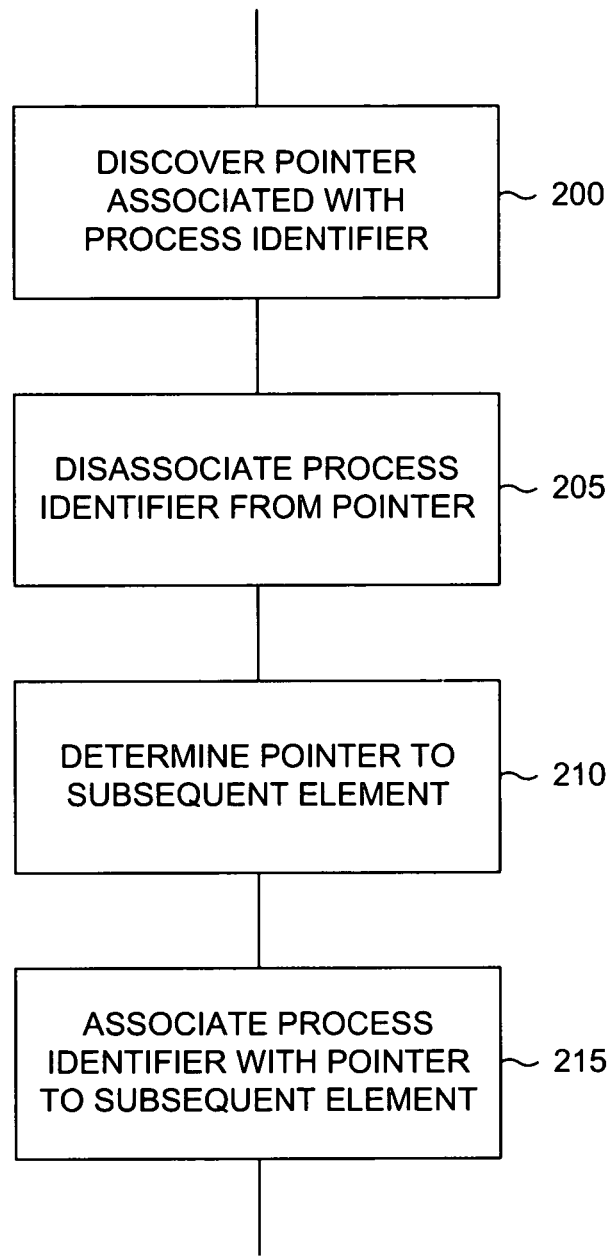
FIG. 7 as a flow diagram that depicts one example method for updating a reference to a data element prior to deletion.

FIG. 7 as a flow diagram that depicts one example method for updating a reference to a data element prior to deletion. According to this example method, a reference to a data element that is subject to deletion is accomplished by discovering a pointer to the data element that is associated with a process identifier (step 200). This pointer is the recommencement reference. The pointer and the process identifier are then disassociated from each other (step 205). A pointer to a subsequent data element is then determined (step 210). According to one variation of the present method, this is accomplished by retrieving a forward pointer from the data element that is subject to deletion. The pointer to the subsequent data element is then associated with a process identifier (step 215).

Figure 8:
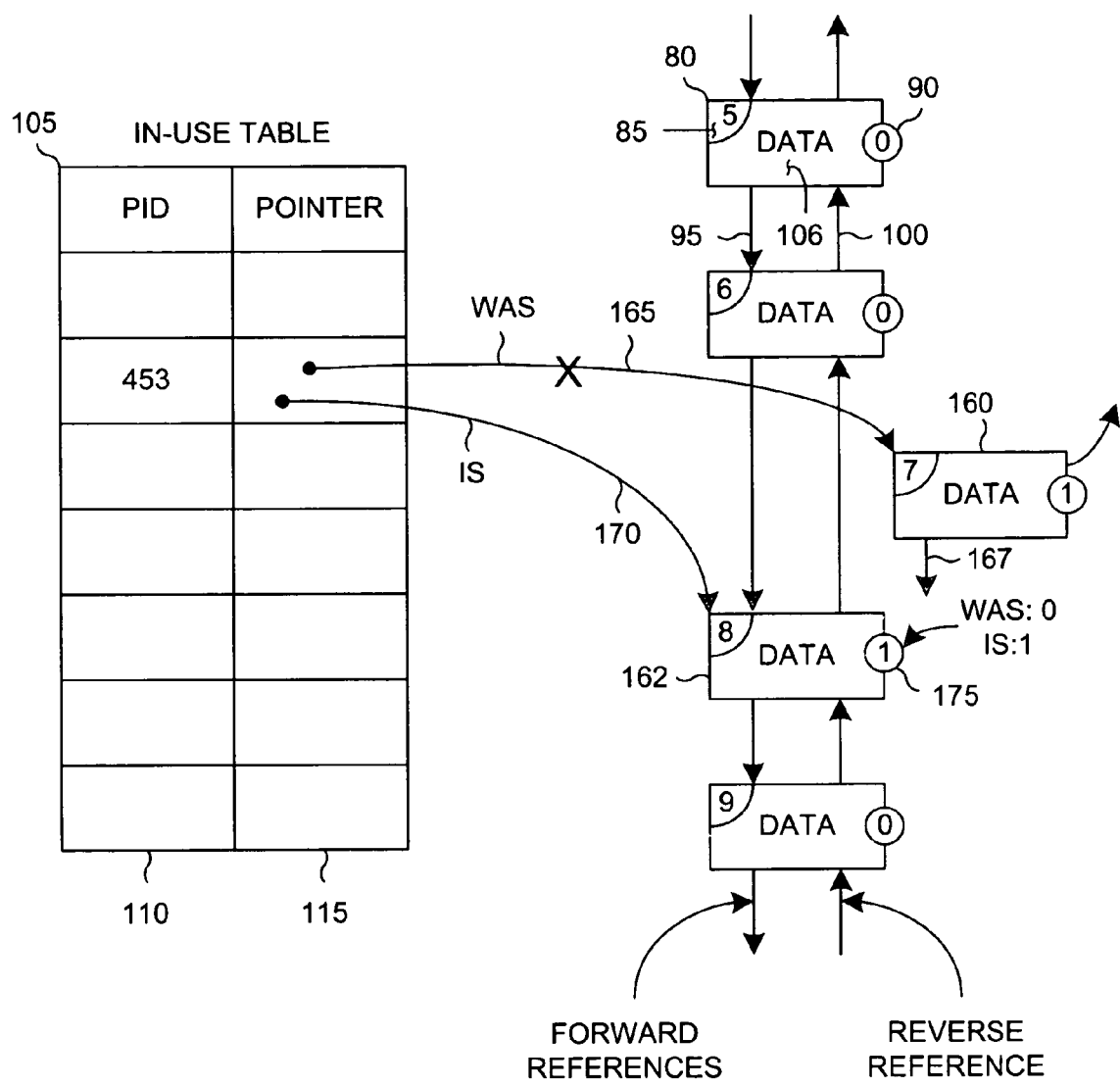
FIG. 8 is a pictorial diagram that illustrates application of one example method for deleting a data element.

FIG. 8 is a pictorial diagram that illustrates application of one example method for deleting a data element. According to one illustrative use case, a typical data element 80 includes data 106, a forward reference 95, a reverse reference 100, an "in-use" indicator 90 and an element identifier 85. It should be noted that the structure of a data element as depicted in the figure is not intended to limit the scope of the claims appended hereto. According to the present method, when a data element (e.g. data element 160) needs to be deleted from a linked list and that data element is marked as "in-use", a recommencement reference to the element needs to be updated to a subsequent data element. Again considering the data element identified in the figure by reference designator 160, a variation of the present method relies on discovering a pointer 165 associated with a process identifier. Typically, the association with a process identifier is implicitly defined by entries in an in-use table 105. For instance, one example embodiment of an in-use table 105 includes a process identifier field 110 and a pointer field 115. As such, a particular process will discover a pointer in the in-use table 105 according to its own process identifier.

The discovered pointer 165 is then disassociated from the process identifier when it is supplanted with a new pointer 170. The new pointer 170 is set to point to a data element 162 that is subsequent to the data element to be deleted. The new pointer 170 can be obtained, according to one variation of the present method, by retrieving a forward reference 167 included in the data element 160 that needs to be deleted. The subsequent data element 162, according to yet another variation of the present method, is marked as "in-use". According to yet another variation of the present method, this is accomplished by incrementing an in-use indicator 175 included in the subsequent data element 162. It should be noted that the scope of the claims appended hereto is not intended to be limited by any implied structure of an in-use table or any data contained therein as depicted in the figure.

Figure 9:
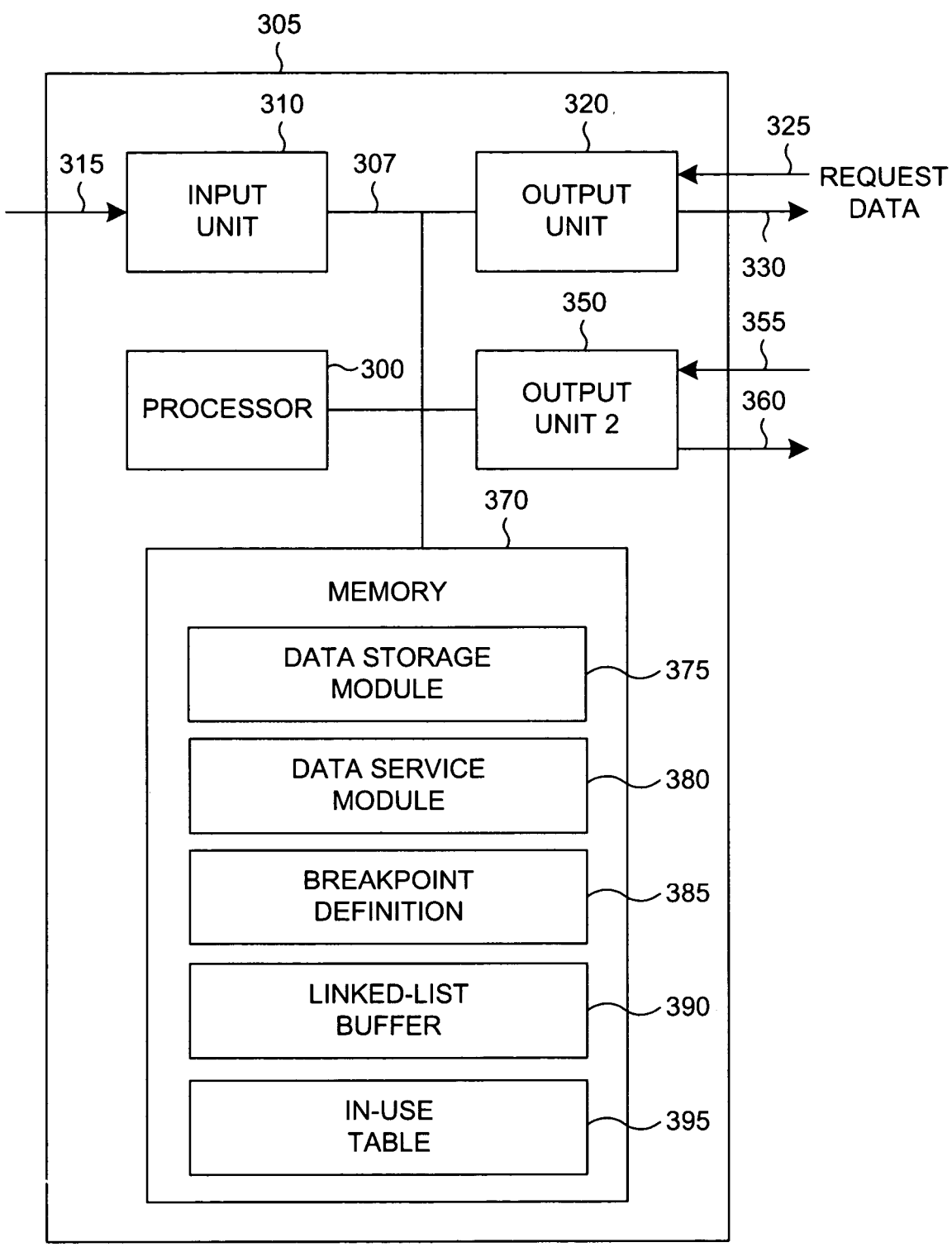
FIG. 9 is a block diagram of one example embodiment of an apparatus for storing and retrieving data.

FIG. 9 is a block diagram of one example embodiment of an apparatus for storing and retrieving data. According to this example embodiment, an apparatus for storing and retrieving data 305 comprises one or more processors 300, a memory 370, an input unit 310 and a plurality of output units. It should be noted that the plurality of output units are referred to as a first output unit 320 and one or more ancillary output units 350. In operation, the input unit 310 enables the processor to receive data 315. The output unit 320 enables the processor 300 to receive a data request. Typically, a data request received from the first output unit 320 will preclude simultaneous access to data when a data request is received by any of the ancillary output units 350. The first output unit 320 is capable of receiving a request for data 325 and is also further capable of providing data 330 in the response to the request. The one or more ancillary output units 350 are also capable of receiving a data request 355 and providing data 360 in response thereto. It should be noted that the afore described features of the present apparatus are communicatively coupled with each other by means of a bus 307.

Also included in this example embodiment of the apparatus 305 are one or more functional modules. A functional module is typically embodied as an instruction sequence. An instruction sequence that implements a functional module, according to one alternative embodiment, is stored in the memory 370. The reader is advised that the term "minimally causes the processor" and variants thereof is intended to serve as an open-ended enumeration of functions performed by the processor 300 as it executes a particular functional module (i.e. instruction sequence). As such, an embodiment where a particular functional module causes the processor 300 to perform functions in addition to those defined in the appended claims is to be included in the scope of the claims appended hereto. Included in this example embodiment of an apparatus for storing and retrieving data 305 are a data storage module 375 and a data service module 380, both of which are stored in the memory 370. The memory 370 also provides storage for a breakpoint definition 385, a linked-list buffer 390 and an in-use table 395.

Figure 10:
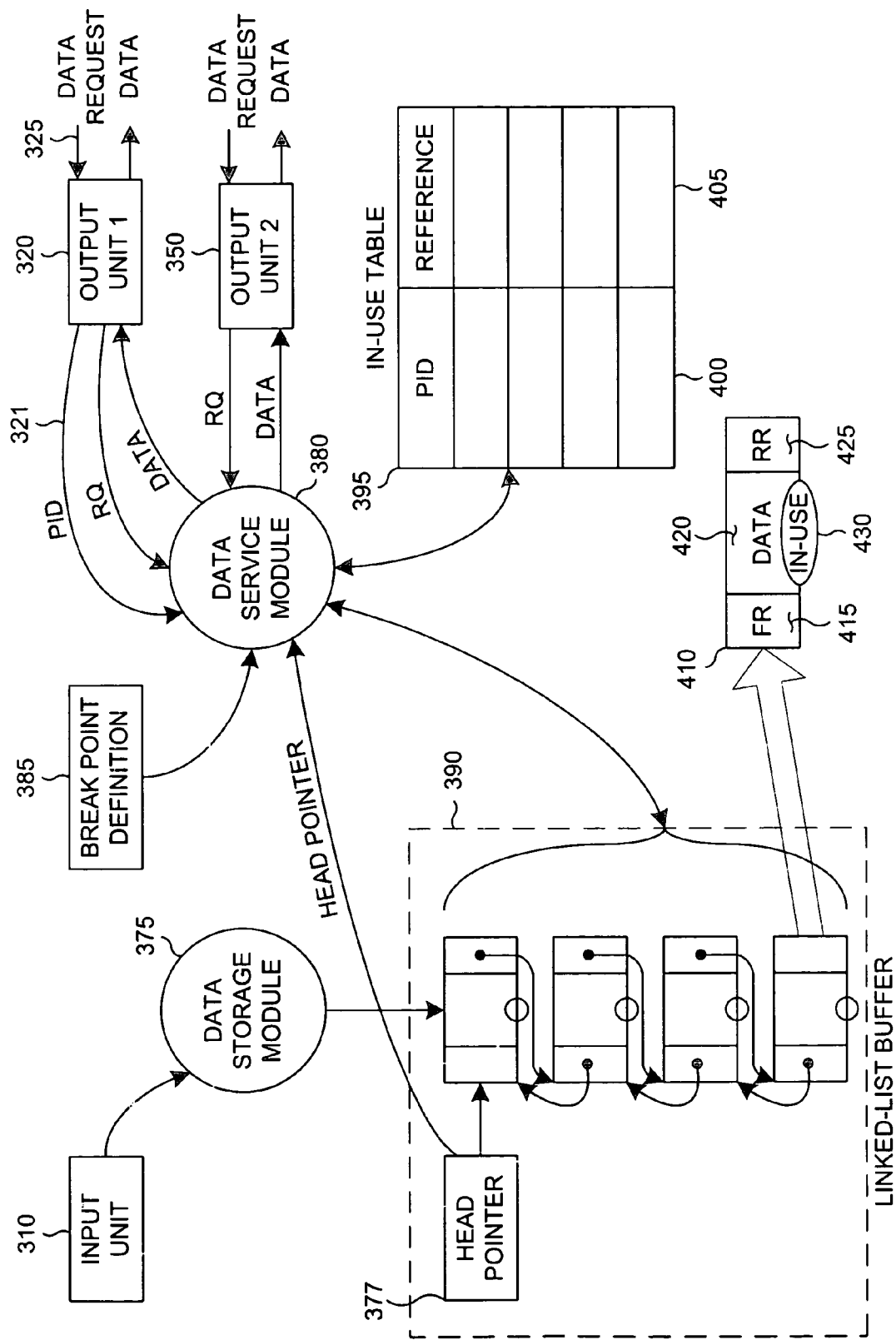
FIG. 10 is a data flow diagram that describes the internal operation of one example embodiment of an apparatus for storing and retrieving data.

FIG. 10 is a data flow diagram that describes the internal operation of one example embodiment of an apparatus for storing and retrieving data. The data storage module 375, when executed by the processor 300, minimally causes the processor 300 to receive data from the input unit 310. Upon receiving data from the input unit 310, the processor 300 then allocates a data element 410 to accommodate the data and then stores the data in the newly allocated data element 410. According to one example alternative embodiment, the data storage module 375 minimally causes the processor 300 to create a reference to a newly allocated data element. In the fashion of a linked-list, the processor 300, as it continues to execute the data storage module 375, will store the reference to the data element in at least one out of a head pointer 377 or a forward reference 415 included in a typical data element 410. According to one illustrative use case, a data element 410 includes a forward reference to 415, a reverse reference 425, data storage 420 and an in-use indicator 430.

In normal operation, the processor 300 further executes the data service module 380. The data service module 380, when executed by the processor 300, minimally causes the processor 300 to receive a data request from the first output unit 320. When such a data request is pending, the processor 300, under control of this example embodiment of the data service module 380, will ignore all other data requests from the one or more ancillary output units 350.

The processor 300, under control of the data service module 380, further minimally provides data to the first output unit 320 according to a received data request 325. The processor 300 provides data to first output unit 320 according to a data element reference. The data element reference can included either a head pointer 377 or a forward reference 415 included in a typical data element 410. Management of the data element reference, according to one alternative embodiment, is accomplished consistent with known linked-list techniques. Once data is provided from a particular data element, the processor 300 further minimally advances the data element reference to a subsequent data element so long as a breakpoint is not encountered. According to one alternative embodiment, the data service module 380, when executed by the processor 300, minimally causes the processor 300 to determine a breakpoint by consulting a breakpoint definition 385 stored in the memory 370. The breakpoint definition 385 can included a quantity indicator that reflects a quantity of data elements that the processor 300 will traverse before relinquishing control over a linked-list maintained in the linked-list buffer 390 stored in the memory 370. According to yet another alternative embodiment, the breakpoint definition 385 comprises a time indicator that represents the maximum amount of time that the processor 300 can monopolize access to the linked-list maintained in the linked-list buffer 390 stored in the memory 370.

When a breakpoint is encountered, the processor 300, as it continues to execute this example embodiment of a data service module 380, marks a subsequent data element as "in-use". This is accomplished, according to one alternative embodiment of a data service module 380, when the processor 300 increments a use counter 430 included in a typical data element 410. Once a subsequent data element is marked as "in-use", the data service module 380, when executed by the processor 300, further minimally causes the processor 300 to create a recommencement reference to the subsequent data element and then causes the processor 300 to recognize other data requests, for example from the one or more ancillary output units 350.

The processor 300, as it continues to execute the data service module 380, may need to continue servicing a data request after returning from a breakpoint according to teaching of the present method. Accordingly, one alternative embodiment of a data service module 380, when executed by the processor 300, further minimally causes the processor to again recognize a data request from the first output unit 320 to the exclusion of all other data requests. The processor 300 then provides data to the first output unit 320 from a data element according to the recommencement reference previously created by the processor 300. As already described, the processor 300 creates the recommencement reference after recognizing a breakpoint, but prior to relinquishing control over a linked-list maintained in the linked-list buffer 390 stored in the memory 370.

The processor 300, as it executes one alternative embodiment of a data service module 380, creates a recommencement reference by retrieving a pointer to a data element that is subsequent to a current data element. The processor 300 then determines an identifier for a data request received from the first output unit 320. This identifier, according to one alternative embodiment, comprises a process identifier (PID) 321 associated with the original data request 325. The processor 300 then further minimally stores the retrieved pointer and the determined identifier in an associative manner. For example, according to yet another example alternative embodiment, the data service module 380 minimally causes the processor 300 to store the determined identifier and the retrieved pointer in an in-use table 395 maintained in the memory 370. Each record in the in-use table 395 includes a process identifier field 400 and a reference field 405. Accordingly, the processor 300, as it continues to execute the data service module 380, further minimally stores the determined identifier in the process identifier field and stores the retrieved pointer in the reference field 405.

According to yet another alternative embodiment, the apparatus for storing and retrieving data 305 is further capable of responding to a delete data request received by the first output unit 320. Accordingly, an alternative embodiment of the data service module 380, when executed by the processor 300, minimally causes the processor 300 to delete a data element by first determining if the data element to be deleted is "in-use". In the case where the data element to be deleted is "in-use", the processor 300 updates a recommencement reference to refer to a data element that is subsequent to the data element to be deleted. This operation is accomplished by the processor 300 in accordance with the techniques and teachings of the present method. For example, one alternative embodiment of the data service module 380, when executed by the processor 300, minimally causes the processor 300 to discover a pointer according to a data request identifier stored in the in-use table 395. Accordingly, the existing pointer in the in-use table 395 is replaced by a new pointer that points to the data element that is subsequent to the data element that is to be deleted.

The functional modules (i.e. their corresponding instruction sequences) described thus far that enable retrieval of data according to the present method are, according to one alternative embodiment, imparted onto computer readable medium. Examples of such medium include, but are not limited to, random access memory, read-only memory (ROM), compact disk ROM (CD ROM), floppy disks, hard disk drives, magnetic tape and digital versatile disks (DVD). Such computer readable medium, which alone or in combination can constitute a stand-alone product, can be used to convert a general-purpose computing platform into a device capable of retrieving data according to the techniques and teachings presented herein. Accordingly, the claims appended hereto are to include such computer readable medium imparted with such instruction sequences that enable execution of the present method and all of the teachings herein described.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for retrieving data comprising:
   locking a linked list;
   retrieving data from an element in said linked list and also advancing to a subsequent element while a breakpoint is not encountered;
   marking the subsequent element in said linked list as in-use when a breakpoint is encountered, wherein marking the subsequent element in said linked list as in-use comprises maintaining a count of a quantity of processes that require additional access to the element;
   creating a recommencement reference to the subsequent element; and
   unlocking said linked list.

2. The method of claim 1 further comprising:
   locking said linked list;
   determining a subsequent element in said linked list according to the recommencement reference; and
   retrieving data from a determined subsequent element.

3. The method of claim 1 wherein creating a recommencement reference to the subsequent element comprises:
   retrieving a pointer to the subsequent element;
   determining a process identifier for a current process; and
   associating the pointer with the process identifier.

4. A method for deleting an element from a linked list comprising:
   determining if the element to be deleted is in-use;
   updating a recommencement reference to the element to refer to a data element that is subsequent to the data element to be deleted when the element in is in-use, wherein said updating a recommencement reference to the element comprises:
      discovering a pointer associated with a process identifier;
      disassociating the process identifier from the pointer;

determining a pointer to a subsequent element; and
associating the process identifier with a newly determined pointer; and deleting the element.

5. An apparatus for storing and retrieving data comprising:
processor to execute an instruction sequence;
memory for storing an instruction sequence;
input unit for receiving data;
first output unit for providing data according to a received data request;
one or more ancillary output units for providing data according to a received data request;
instruction sequences stored in the memory including:
data storage module that, when executed by the processor, minimally causes the processor to:
receive data from the input unit;
allocate a data element to accommodate the data;
create a reference to the data element;
store the reference in at least one of a header pointer and a forward pointer included in a preceding data element; and
store the data in the data element;
data service module that, when executed by the processor, minimally causes the processor to:
recognize a data request from the first output unit to the exclusion of all other data requests;
provide data to the first output unit from a data element according to a data element reference and also advance the data element reference to a subsequent data element while a breakpoint is not encountered;
mark a subsequent data element as in-use when a breakpoint is encountered, wherein the data service module causes the processor to mark a subsequent data element as in-use by minimally causing the processor to increment a use counter included in a subsequent data element;
create a recommencement reference to a subsequent data element; and
enable recognition of other data requests.

6. The apparatus of claim 5 wherein the data service module, when executed by the processor, further minimally causes the processor to:
recognize a data request from the first output unit to the exclusion of all other data requests; and
provide data to the first output unit from a data element according to the recommencement reference.

7. The apparatus of claim 5 wherein the data service module causes the processor to create a recommencement reference by minimally causing the processor to:
retrieve a pointer to a data element subsequent to a current data element;
determine an identifier associated with the data request received from the first output unit; and
store a retrieved pointer and a determined identifier in an associative manner.

8. The apparatus of claim 5 wherein the data service module further minimally causes the processor to receive a delete data request from an output unit by minimally causing the processor to:
determine if a data element to be deleted is in-use;
update a recommencement reference to refer to a data element that is subsequent to the data element to be deleted; and
delete the data element according to a received delete data request.

9. The apparatus of claim 8 wherein the data service module causes the processor 10 update a recommencement reference by minimally causing the processor to:
discover a pointer according to a data request identifier; and
replace the pointer with a pointer to a data element that is subsequent to the data element to be deleted.

10. A non-transitory computer readable storage medium having imparted thereon one or more instruction sequences for storing and retrieving data comprising:
data storage module that, when executed by a processor, minimally causes the processor to;
receive data from an input unit;
allocate a data element to accommodate the data;
create a reference to the data element;
store the reference in at least one of a header pointer and a forward pointer included in a preceding data element; and
store the data in the data element;
data service module that, when executed by a processor, minimally causes the processor to:
recognize a data request from a first output unit to the exclusion of all other data requests;
provide data to a first output unit from a data element according to a data element reference and also advance the data element reference to a subsequent data element while a breakpoint is not encountered;
mark a subsequent data element as in-use when a breakpoint is encountered, wherein the data service module causes a processor to mark a subsequent data element as in-use by minimally causing the processor to increment a use counter included in a subsequent data element;
create a recommencement reference to a subsequent data element; and
enable recognition of other data requests.

11. The non-transitory computer readable storage medium of claim 10 wherein the data service module, when executed by a processor, further minimally causes the processor to:
recognize a data request from a first output unit to the exclusion of all other data requests; and
provide data to a first output unit from a data element according to the recommencement reference.

12. The non-transitory computer readable storage medium of claim 10 wherein the data service module causes a processor to create a recommencement reference by minimally causing the processor to;
retrieve a pointer to a data element subsequent to a current data element;
determine an identifier associated with a data request received from a first output unit; and
store a retrieved pointer and a determined identifier in an associative manner.

13. The non-transitory computer readable storage medium of claim 10 wherein the data service module further minimally causes the processor to receive a delete data request from an output unit by minimally causing the processor to:
determine if a data element to be deleted is in-use;
update a recommencement reference to refer to a data element that is subsequent to the data element to be deleted; and
delete the data element according to a received delete data request.

14. The non-transitory computer readable storage medium of claim 13 wherein the data service module causes the processor to update a recommencement reference by minimally causing the processor to:
discover a pointer according to a data request identifier; and replace the pointer with a pointer to a data element that is subsequent to the data element to be deleted.

15. An apparatus for storing and retrieving data comprising:
- means for locking a linked list;
- means for retrieving data from an element in said linked list and also advancing to a subsequent element while a breakpoint is not encountered;
- means for marking the subsequent element in said linked list as in-use when a breakpoint is encountered, wherein marking the subsequent element in said linked list as in-use comprises maintaining a count of a quantity of processes that require additional access to the element;
- means for creating a recommencement reference to the subsequent element; and
- means for unlocking said linked list.

16. The apparatus of claim 15 further comprising:
- means for locking said linked list;
- means for determining a subsequent element in said linked list according to the recommencement reference; and
- means for retrieving data from the determined subsequent element.

17. The apparatus of claim 15 further comprising a means for deleting an element in said linked list.

18. The apparatus of claim 17 wherein the means for deleting an element comprises:
- means for determining if the element to be deleted is in-use;
- means for updating a reference to the element to refer to a subsequent element in said linked list when the element in is in-use; and
- means for deleting the element.

* * * * *

UNITED STATES PATENT AND TRADEMARK OFFICE
CERTIFICATE OF CORRECTION

| | |
|---|---|
| PATENT NO. | : 8,977,651 B2 |
| APPLICATION NO. | : 10/823845 |
| DATED | : March 10, 2015 |
| INVENTOR(S) | : David Hsing Lin |

It is certified that error appears in the above-identified patent and that said Letters Patent is hereby corrected as shown below:

In the Claims,

In column 9, line 66, in Claim 9, delete "10" and insert -- to --, therefor.

In column 10, line 45, in Claim 12, delete "to;" and insert -- to: --, therefor.

Signed and Sealed this
Eleventh Day of August, 2015

Michelle K. Lee
*Director of the United States Patent and Trademark Office*